(12) United States Patent
Chen et al.

(10) Patent No.: US 7,454,715 B2
(45) Date of Patent: Nov. 18, 2008

(54) OPEN GRID NAVIGATIONAL SYSTEM

(75) Inventors: Christina Summer Chen, Kirkland, WA (US); Mattias J. Gruvman, Gothenburg (SE); Gregory Edmund Murphy, Redmond, WA (US); Jan Andreas Roman, Gothenburg (SE)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 10/359,340

(22) Filed: Feb. 4, 2003

(65) Prior Publication Data

US 2004/0150675 A1 Aug. 5, 2004

(51) Int. Cl.
*G06F 3/048* (2006.01)
*A63F 9/24* (2006.01)
*G01C 21/00* (2006.01)
*G01C 21/30* (2006.01)

(52) U.S. Cl. .................. 715/850; 715/848; 715/764; 463/6; 463/1; 463/31; 701/201; 701/211

(58) Field of Classification Search ............ 345/853, 345/854, 855, 848, 850, 851; 463/1, 6, 31, 463/59; 715/848, 764, 850; 701/201, 211
See application file for complete search history.

(56) References Cited

U.S. PATENT DOCUMENTS 5,269,687 A * 12/1993 Mott et al. .................. 434/69
5,568,602 A * 10/1996 Callahan et al. .......... 715/500.1
5,627,547 A    5/1997  Ramaswamy et al.
5,890,089 A    3/1999  Ogino et al.
6,200,138 B1 * 3/2001  Ando et al. .................. 434/61
6,201,544 B1 * 3/2001  Ezaki .......................... 345/419
6,409,597 B1 * 6/2002  Mizumoto .................... 463/31
6,652,376 B1 * 11/2003 Yoshida et al. ................ 463/6
2002/0128772 A1 * 9/2002 Polidi et al. ................ 701/208

FOREIGN PATENT DOCUMENTS

| EP | 1029569  | 8/2000 |
|----|----------|--------|
| JP | 07037198 | 2/1995 |
| JP | 09239154 | 9/1997 |

OTHER PUBLICATIONS

"Crazy Taxi" 'Online! Jan. 24, 2000, Sega Enterprises, LTD <www.gamefaqs.com>.

* cited by examiner

*Primary Examiner*—Ting Zhou
(74) *Attorney, Agent, or Firm*—Workman Nydegger

(57) ABSTRACT

To assist a player in navigating an open grid within a game or virtual environment, a global indicator and a local indicator are displayed within the virtual environment. The global indicator continuously indicates a straight line direction between an object controlled by the player and a next goal unattained within the virtual environment. As the object approaches within a predefined distance from a turn that should be taken to reach the next unattained goal, a local indicator is displayed showing the direction that the object should be turned to reach the goal. The local indicator is removed from the display after a predefined time has elapsed. Preferably, the local indicator is not displayed before a turn so long as continuing to move the object along a current path without turning at the next turn will permit the object to reach the next unattained goal.

30 Claims, 6 Drawing Sheets

OPEN GRID NAVIGATIONAL SYSTEM

FIELD OF THE INVENTION

This invention generally pertains to a graphic user interface for navigating through an open grid, and more specifically, pertains to a method and system for indicating a direction from an object to a goal as well as indicating turns for navigating the object through an open grid to reach the goal.

BACKGROUND OF THE INVENTION

One category of electronic games involves controlling an object while it is in motion along paths or streets comprising an open grid. The object may be a vehicle, such as a motorcycle or automobile, or can be a character or creature within the virtual environment of the game. An open grid generally provides limits on the direction of motion of the object within the virtual environment. For example, an open grid may be the streets that are generally laid out in orthogonal directions that define blocks. Although constraints imposed on the movement of an object within a virtual environment may depend on the game, even if an object is able to leave the limits of the open grid on which it is traveling, in most games of this type, the object will normally travel along the streets or paths defining the open grid and preferably remain on them at all times (unless the player "loses control" of the object).

In many games that employ an open grid, a player can selectively navigate along various routes, constrained only by the limits of the game and the design of the open grid. Thus, an open grid virtual environment is in contrast to a virtual environment that enables or encourages more unrestrained movement of an object. For example, a game in which a player is flying a plane or a spaceship will permit the player to freely control the plane or spaceship in three dimensions, limited only by the practical considerations of hitting barriers or other objects within the virtual environment of the game.

In electronic games that employ an open grid, a player will typically try to reach goals that are disposed at predefined locations within the open grid. Thus, the winner of such a game may be the player that navigates an object through the open grid and reaches all of the goals in the shortest total time. When navigating toward a goal, it will be necessary for the player controlling an object, such as an automobile, to turn the object at intersections of the open grid and follow the streets or paths of the open grid that lead to each successive goal. To assist a player in navigating through the open grid, an overview map showing the relative location of the object being controlled by the player and the next goal to be reached is sometimes provided. While an overview map is helpful, it may still be somewhat difficult for the player to track the moving object on the map relative to the goals, while controlling the object to navigate through the open grid to each successive goal.

Another form of assistance that is sometimes provided to a player is a goal indicator that shows the direction (as the "crow flies," or in a straight line that is not restricted by the limits of the open grid) to the next goal from the object that the player is navigating. The goal indicator can be an arrow or other directional symbol, or a compass heading that is displayed in the window in which the virtual environment of the game is displayed. The goal indicator provides a general sense of where the goal is relative to the object, but cannot help a player avoid turning down dead end paths that may seem to lead toward a goal, or taking other inappropriate turns, or passing a turn that should have been taken. This problem can be particularly frustrating to players who are less skilled in playing games. Clearly, what is needed to help such players navigate through an open grid is assistance in determining where to turn and in which direction to turn in order to reach the next goal. Indicating the directions and locations to turn, as well as indicating the general direction toward the goal, should greatly ease the burden of navigating through an open grid in an electronic game or other virtual environment.

SUMMARY OF THE INVENTION

The present invention is particularly useful in electronic games that are designed for younger or less skillful players, but is applicable to almost any type of electronic game or virtual environment having an open grid through which an object is moved under the control of a player, to reach a goal. A method in accord with the present invention includes the step of displaying a global indicator that points in a direction from the object toward the goal within the virtual environment. The global indicator is independent of a path through the open grid, but instead, points in the direction from the object to the goal generally as the "crow flies." In addition, a local indicator is provided that generally points so as to clearly indicate where and in which direction a next turn should be taken in the virtual environment, so that the object can follow the open grid in reaching the goal. Thus, the local indicator shows the player where to turn the object while moving along the open grid in the virtual environment. For example, if the open grid comprises streets laid out in the virtual environment, the local indicator provides a visual recommendation sufficiently before an intersection, to enable the player to turn the object at the intersection in the direction shown.

The local indicator is preferably displayed only when the object is within a predefined distance from the next turn that should be taken, so that it will be apparent where the player should turn the object. It is also contemplated that the predefined distance before the turn at which the local indicator is displayed can be varied as a function of a speed of the object within the virtual environment. Clearly, if the object is traveling faster, it is preferable to display the local indicator sooner, to avoid the player having too little time to react to the local indicator and make the turn, and to thereby avoid the object continuing past the turn that should be taken.

The goal can be almost anything, depending upon the nature of the game or virtual environment, and be merely one of a plurality of goals that are to be reached by the object. In this case, the global indicator will point in the direction of each successive goal (i.e., the next goal) that is yet to be reached by the object, after a previous goal is reached. Similarly, the local indicator will indicate turns on the open grid that should be taken in the virtual environment to reach a successive goal, after a previous goal is reached. Therefore, the global indicator and the local indicator only respond to the location of a current goal in the virtual environment. Also, (depending upon the rules of the game being played), a goal is deleted from the plurality of goals after the goal is reached by the object, even if not in a predefined order. The global indicator and the local indicator do not respond to a goal that has been deleted.

An open grid can have a plurality of different routes or path that lead to a goal. Preferably, in the present invention, if continuing on a current path without turning will still enable the object to reach the goal in the virtual environment, the local indicator is not displayed before a next turn that could be taken to reach the goal. However, a player is free to disregard the route that the local indicator suggests. In a preferred embodiment, the local indicator only indicates a left turn, a right turn, or a U-turn.

Another aspect of the present invention is directed to a system for providing assistance to a player in controlling an object to reach a goal in an open grid of a virtual environment. The system includes a display, a memory in which machine instructions are stored, and a processer that executes the machine instructions. The machine instructions cause the processor to carry out functions generally consistent with steps of the method that were discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

PC for Implementing the Present Invention

Figure 1:
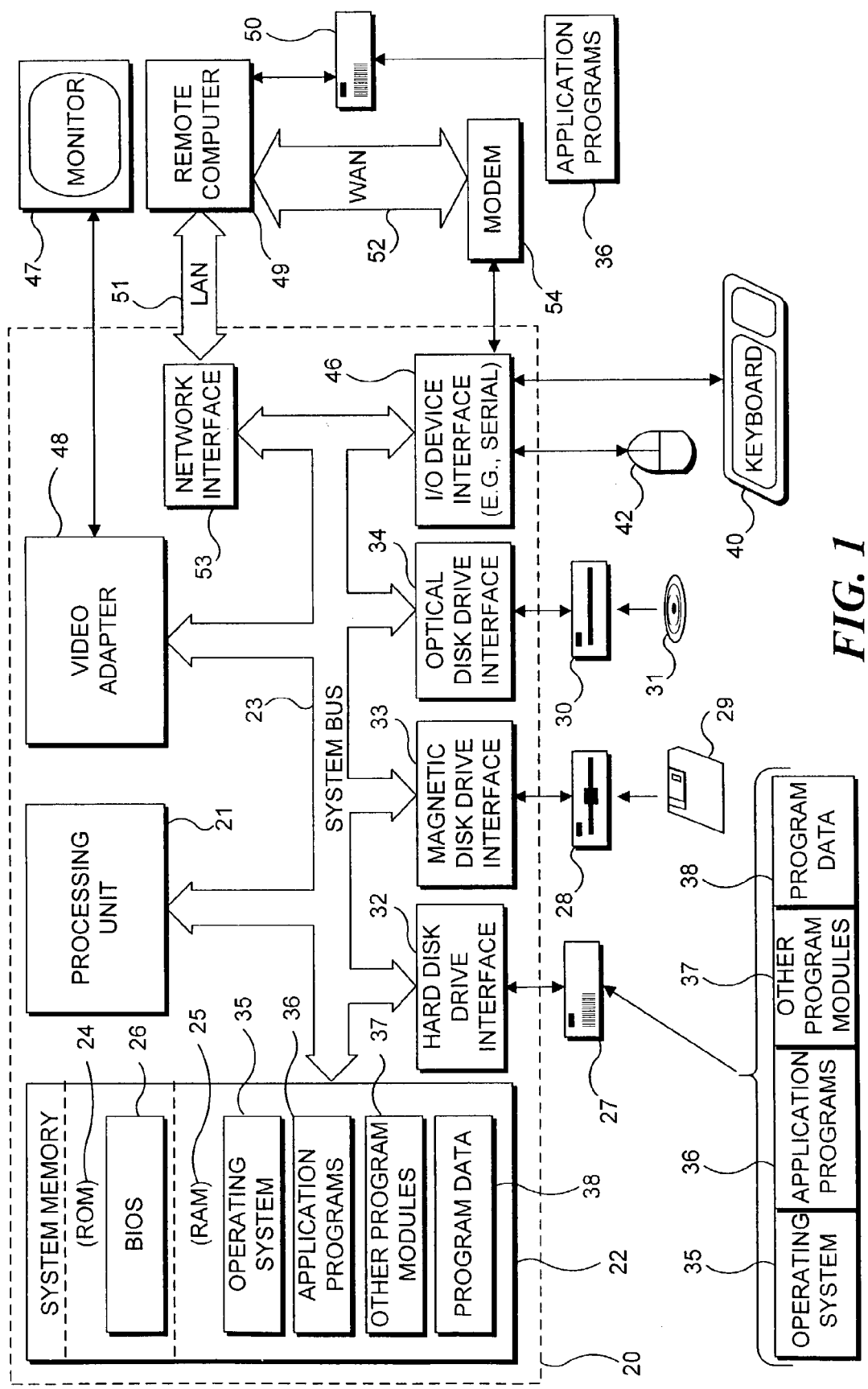
FIG. 1 is a functional block diagram of a personal computer (PC) that is suitable for executing the present invention.

With reference to FIG. 1, an exemplary general purpose computing device useful for implementing the present invention is illustrated in the form of a conventional PC 20. While the present invention was initially developed for use on an electronic game playing system, it will be understood that the invention is generally applicable to almost any type of computing device that might be used to play electronic games or display navigate through a virtual environment, including, for example, mobile computers, hand held computing devices such as personal data assistants (PDAs), mobile communication devices (e.g., cell phones), and other computing devices that include a display on which a virtual environment is represented and which provide for controlling an object as it navigates an open grid to reach a goal.

An embodiment of the present invention is readily implemented on a general purpose computing device such as represented by PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disk drive 30 for reading from or writing to a removable optical disk 31, such as a CD-ROM or other optical media, all of which comprise non-volatile memory media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disk 31, it will be appreciated by those skilled in the art that other types of computer readable media, which can store data that are accessible by a computer, such as magnetic cassettes, flash memory cards, DVDs, Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated or virtual environment such as in the present invention, and/or other information, including visual content of a digital media work that is being played from its original distribution medium, such as a CD-ROM, DVD, or other storage medium. In addition to the monitor, PCs are often coupled to other peripheral output devices (not shown), such as speakers 55 (through a sound card or other audio interface (not shown)), and printers (also not shown).

As indicated above, the invention may be developed and practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a game console, a peer device, a satellite, or other common network node. Remote computer 49 may include many or all of the elements described above in connection with PC 20. So as not to make FIG. 1 unnecessarily complex, remote computer 49 is shown with only an external memory storage device 50. The logical connections depicted in FIG. 1 include a local area network (LAN) 51 and a wide area network (WAN) 52. Such networking environments are common in offices, enterprise wide computer networks, intranets, and the Internet. When coupled to the Internet, electronic games or other applications in which a virtual environment is employed can be loaded and executed, permitting for example, play of an electronic game or interaction in a virtual environment with other PCs over the network.

When used in a LAN networking environment, PC 20 is typically connected to LAN 51 through a network interface or adapter 53, which may be a wireless network adapter. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Electronic Gaming Console Environment

Figure 2:
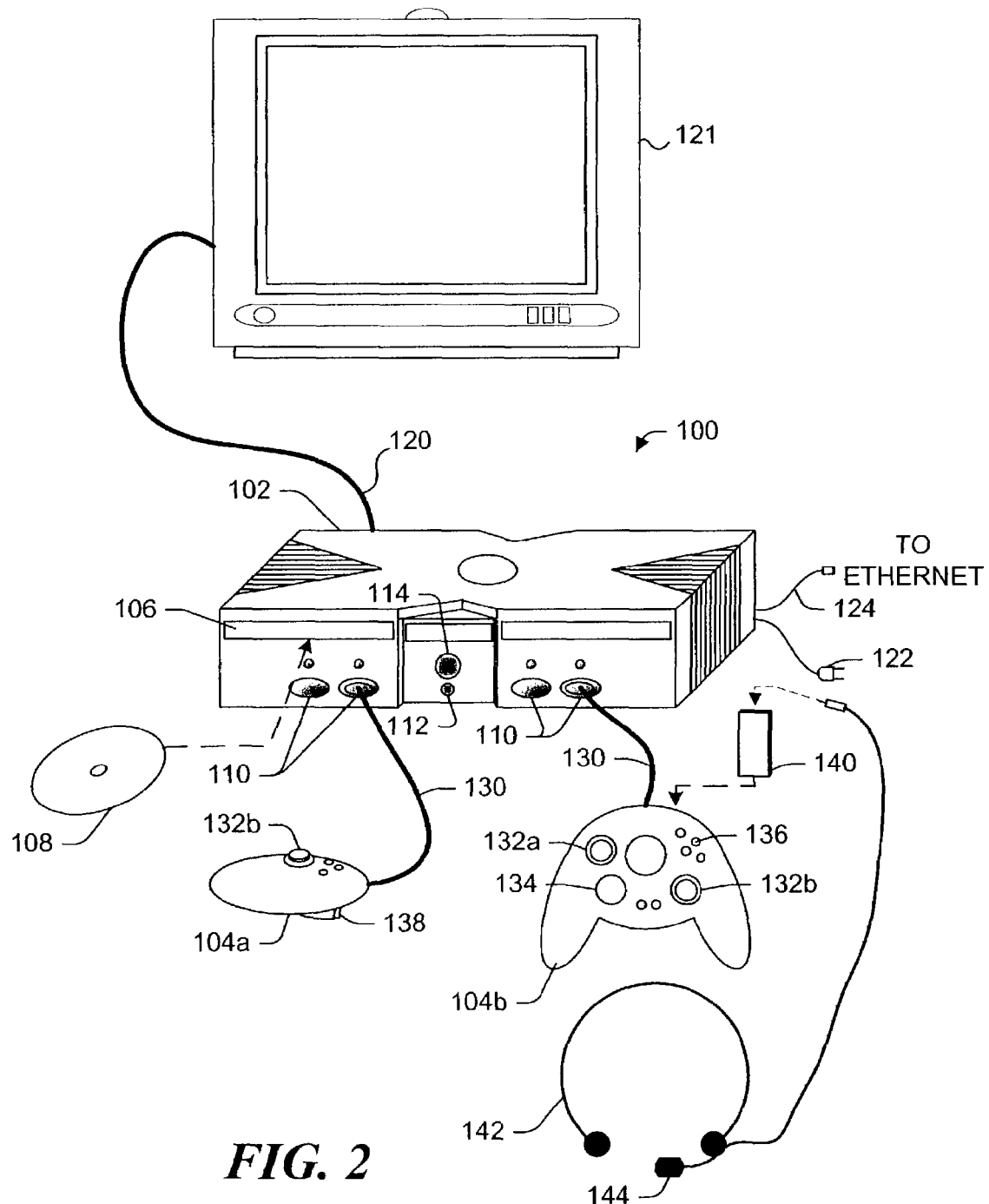
FIG. 2 is an isometric view of an electronic game console and associated components, for use in executing the present invention.

As shown in FIG. 2, an exemplary electronic gaming system 100 that is suitable for practicing the present invention includes a game console 102 and support for up to four user input devices, such as controllers 104*a* and 104*b*. Game console 102 is equipped with an internal hard disk drive (not shown in this Figure), which provides non-volatile storage, and a portable media drive 106 that supports various forms of portable optical storage media, as represented by an optical storage disk 108. Examples of suitable portable storage media include DVD discs and CD-ROM discs. In this gaming system, game programs are preferably distributed for use with the game console on DVD discs, but it is also contemplated that other storage media might instead be used on this or other types of systems that employ the present invention.

On a front face of game console 102 are four slots 110 for connection to supported controllers, although the number and arrangement of the slots may be modified. A power button 112 and an eject button 114 are also positioned on the front face of game console 102. Power button 112 controls application of electrical power to the game console, and eject button 114 alternately opens and closes a tray (not shown) of portable media drive 106 to enable insertion and extraction of storage disk 108, so that the digital data on it can be read for use by the game console.

Game console 102 connects to a television or other display monitor or screen 121 via audio/visual (A/V) interface cables 120. A power cable plug 122 conveys electrical power to the game console when connected to a conventional alternating current line source (not shown). Game console 102 includes an Ethernet data connector 124 to transfer and receive data over a network (such as through a connection to a hub or a switch (not shown)), or over the Internet, for example, through a connection to an xDSL interface, a cable modem, or other broadband interface (not shown). Other types of game consoles that implement the present invention may be coupled together or to a remote server, by communicating using a conventional telephone modem, but the ability to connect to another computer or game console is not particularly relevant to the present invention.

Each controller 104*a* and 104*b* is coupled to game console 102 via a lead (or alternatively through a wireless interface). In the illustrated implementation, the controllers are USB compatible and are connected to game console 102 via USB cables 130; however, it is contemplated that other types of data interfaces may instead be employed. Game console 102 may be equipped with any of a wide variety of user devices for interacting with and controlling the game software. As illustrated in FIG. 2, each controller 104*a* and 104*b* is equipped with two thumbsticks 132*a* and 132*b*, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into each controller 104*a* and 104*b* to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. The circuitry of the voice communication unit may alternatively be integrated into the controller and another headset with boom microphone, may be removably or permanently connected to the controller. Preferably, each controller is configured to accommodate two removable function units, although more or fewer than two removable function units or modules may instead be employed.

Gaming system 100 is capable of playing a variety of types of digital media works, including, for example, music and videos. It is contemplated that other functions can be implemented using digital data stored on the hard disk drive or read from optical storage disk 108 in drive 106, or using digital media works obtained from an online source, or from a MU. For example, gaming system 100 is potentially capable of playing:

Digital music stored on a CD in portable media drive 106, in a file on the hard disk drive (e.g., WINDOWS MEDIA AUDIO™ (WMA) format), or derived from online streaming sources on the Internet or other network; and Digital A/V data stored on a DVD disc in portable media drive 106, or in a file on the hard disk drive (e.g., after the media work has been copied and converted to an Active Streaming Format), or from online streaming sources on the Internet or other network.

Exemplary Virtual Environment Showing Use of Present Invention

Figure 3:
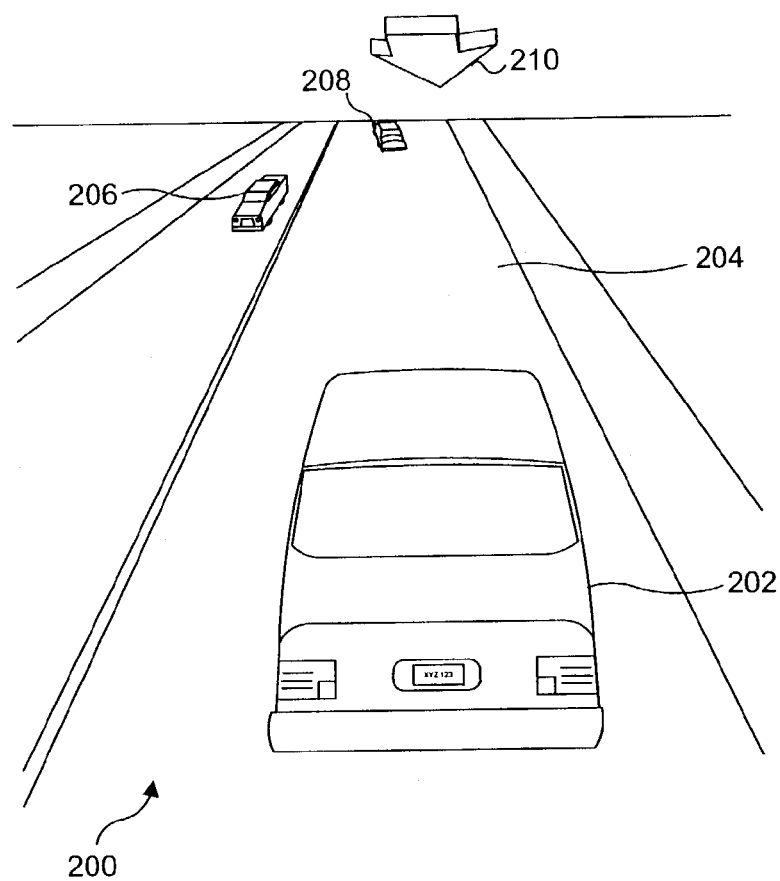
FIG. 3 is a simplified exemplary view of a virtual environment in which a controlled automobile navigates an open grid, and illustrates a global arrow indicating a direction toward a next checkpoint or goal.
Figure 4:
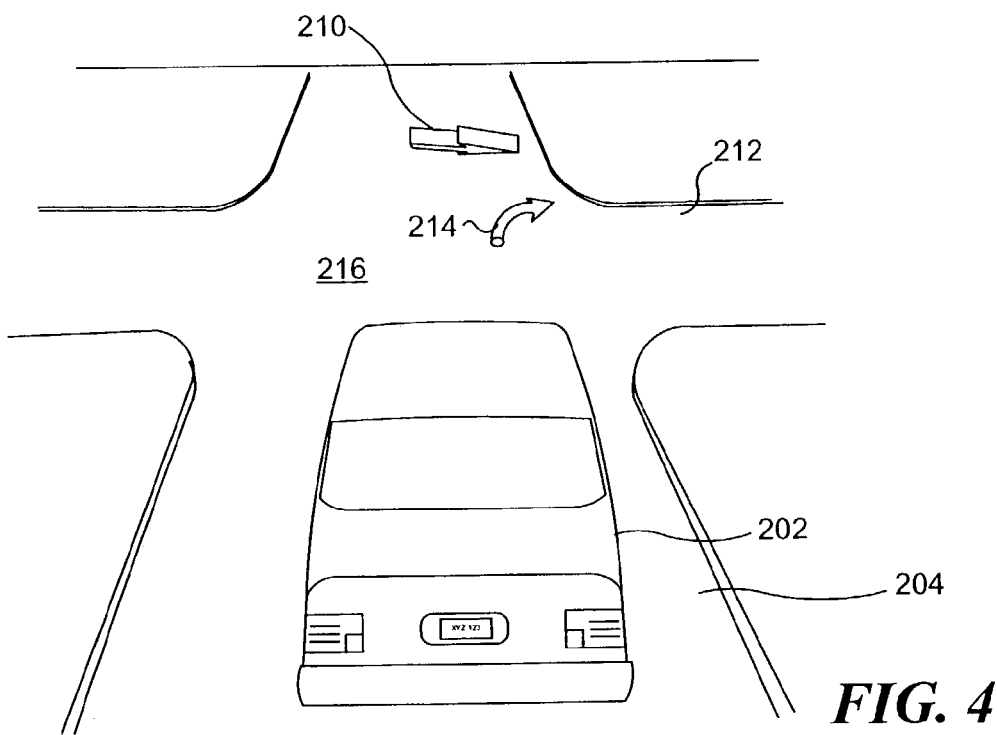
FIG. 4 is a simplified exemplary view of a different portion of the virtual environment of FIG. 3, showing both the global arrow indicating a direction toward a next checkpoint or goal, and a local arrow that indicates the driver of the automobile should turn right at the next corner in the virtual environment.
Figure 5:
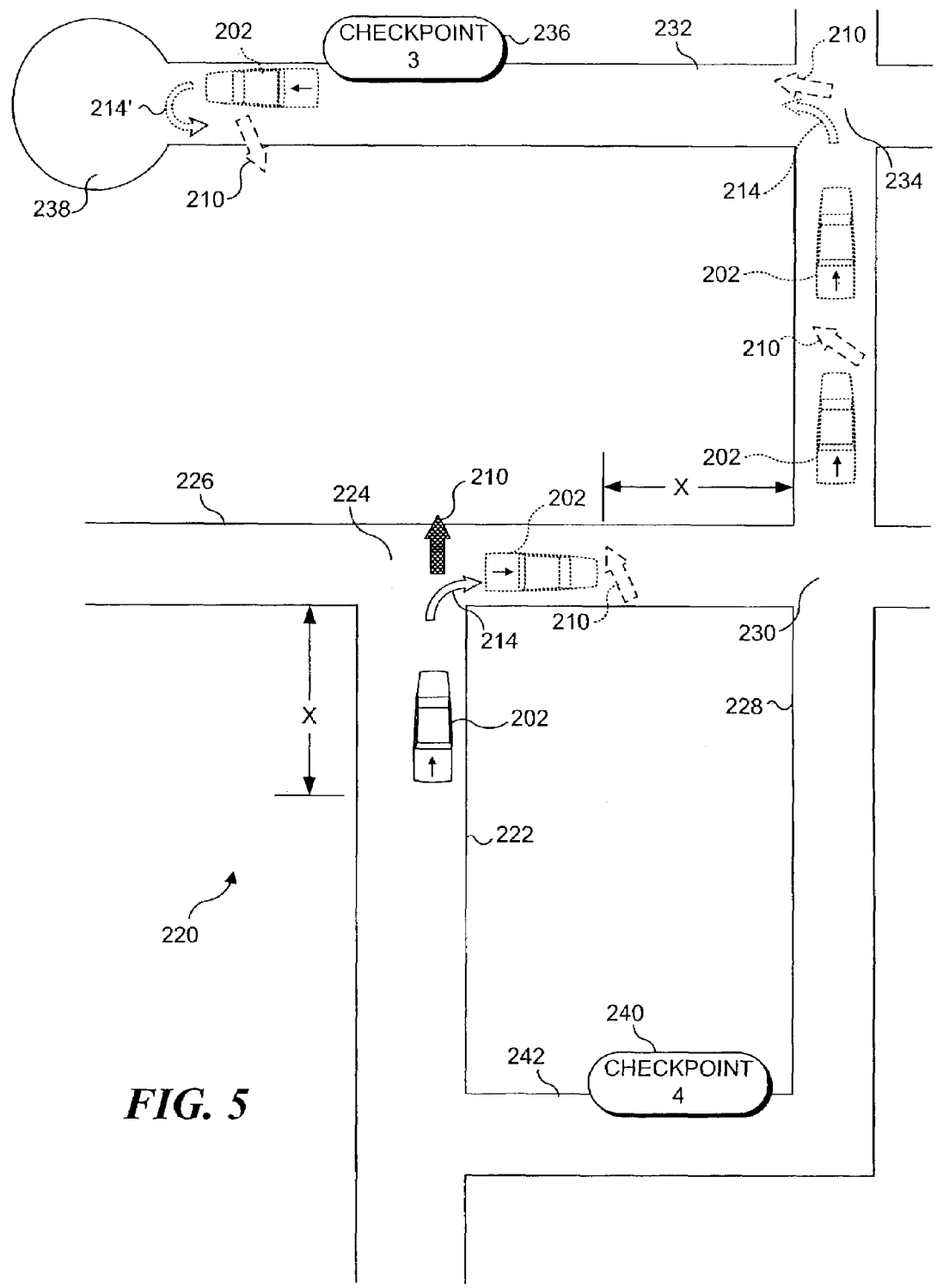
FIG. 5 is an exemplary overhead map view of the open grid, showing the relative positions of the automobile and checkpoints and illustrating how the global arrow and local arrow are employed to provide assistance in navigating through the open grid to each successive checkpoint.

FIGS. 3, 4, and 5 illustrate how the present invention is applied within an electronic game in which players attempt to control an automobile to navigate the streets of a virtual environment to reach a succession of checkpoints. The player that reaches all of the checkpoints in the shortest time is the winner in this simple game. Generally, the streets in the game along which the vehicles controlled by the players move, are laid out in an open grid in which the streets intersect at about 90 degrees. FIG. 3 illustrates an exemplary simplified display 200 within such a game. As shown in this Figure, a vehicle 202 is controlled by a player using a game pad, joystick, or other appropriate user input device, such as those discussed above in regard to PC 20 and game console 100 of FIGS. 1 and 2, respectively. Although not constrained to remain on a street 204 in FIG. 3, vehicle 202 is preferably controlled to drive along street 204, when heading toward the next checkpoint or goal, avoiding other objects such as vehicles 206 and 208. In a game, it is likely that landscaping and other types of objects might be included along the sides of the streets, to encourage the player to drive the vehicle only on the open grid. To assist the player controlling vehicle 202, a global indicator 210 is provided on display 200 and appears generally as a compass arrow showing the straight line direction between vehicle 202 and the next checkpoint in a succession of checkpoints that the player much reach during game play. The direction to the next checkpoint indicated by global indicator 210 is independent of the open grid defined by streets such as street 204 along which vehicle 202 is preferably moving in the virtual environment.

It should be noted that the player controlling vehicle 202 may be free to take various routes to reach the next checkpoint, and given only the direction indicated by global indicator 210, will have some idea where to drive vehicle 202 within the constraints of the open grid. The player may also be provided with an overhead map (not included in the illustrated example) showing the general location of vehicle 202 in regard to the open grid, but the overhead map may have a limited scope, so that the player will not necessarily be able to plot a path along the open grid using the overhead map, to reach the next checkpoint. Using global indicator 210, the player can control vehicle 202 without the overhead map, so that it continues along the streets of the open grid, generally in the direction indicated by global indicator 210. However, as noted above under the Background of the Invention, use of only global indicator 210 will not always provide sufficient information to enable a player to follow the correct street and turn where necessary to reach the next checkpoint. In some cases, a player might take a turn that seems appropriate to reach the next checkpoint, as indicated only by the direction of global indicator 210, and subsequently determine that the turn taken was a bad choice, because it leads to a dead end or to some other hazard or impassable barrier.

FIG. 4 illustrates how the present invention displays a local indicator 214 in the virtual environment to assist the player in navigating through the open grid to reach the next checkpoint or goal. As shown in FIG. 4, the player has followed street 204, which has led to an intersection 216 with a street 212 that extends at right angles to street 204. The player controlling vehicle 202 will know that the vehicle should be turned right at intersection 216 onto street 212, since local indicator 214 clearly shows that the turn should be made in that direction. Although not evident in FIG. 4, global indicator 210 will have been pointing generally toward the right (as shown in FIG. 3) for several intersections, but local indicator 214 will not be displayed until vehicle 202 is approaching intersection 216. Because local indicator 214 is displayed, the player controlling vehicle 202 will understand that the vehicle should be turned to the right at intersection 216 and should not continue straight ahead on street 204 until another intersection is approached.

It should also be understood that the particular views illustrated in FIGS. 3 and 4 are from an observation point that is behind the vehicle being controlled. However, the present invention is not limited to that viewpoint. It is contemplated that the player's viewpoint could instead be from the driver's seat inside vehicle 202, for example, looking out through a front window of the vehicle. Other user or game selectable viewpoints are also contemplated in regard to the present invention. Accordingly, it is not intended that any limitation be implied by the manner in which the local indicator 214 and global indicator 210 are illustrated relative to vehicle 202 in these simple examples. Also, to reduce the complexity of the drawings, buildings, trees, shrubbery, signs, and other objects and elements of the game are not shown within the exemplary displays of FIGS. 3 and 4.

FIG. 5 illustrates further details of the present invention by way of an example represented by an overhead view 220. As shown in FIG. 5, vehicle 202 is currently traveling on a street 222 and is approaching a "T" intersection 224, where street 222 meets a street 226 and does not continue any further. In this example, global indicator 210 is currently pointing in the same direction as vehicle 202 is currently traveling. Under this circumstance, based only on the information provided by the global indicator, a player would not know whether to turn left or right onto street 226 at intersection 224. However, the present invention displays local indicator 214 in the virtual environment, so that the player can be alerted that vehicle 202 should make a right turn onto street 226 from street 222. This example makes clear the benefit of providing both global indicator 210 and local indicator 214 on the display, so that the person controlling an object such as vehicle 202 will know when to make a turn and in which direction to turn to reach a goal such as a checkpoint 236 (i.e., "CHECKPOINT 3"). Without local indicator 214 it would not be apparent that the vehicle should be turned right at intersection 224. Indeed, it is possible that if the player were to turn vehicle 202 toward the left, with the expectation of being able to follow a different route to reach checkpoint 236 while traveling in that direction, the player might then find that street 226 reaches a dead end, or does not intersect with another street that would enable vehicle 202 to travel toward checkpoint 236.

Another important aspect of the present invention is that local indicator 214 is not displayed to the user until vehicle 202 is within a predefined distance "X" from intersection 224. By displaying local indicator 214 only within the predefined distance from an intersection at which a next turn is to be made, confusion is avoided in regard to where the player should control the vehicle to make a turn. In addition, the distance before the intersection at which the local indicator is first displayed is sufficient so that the player will have adequate time to slow vehicle 202 as necessary to negotiate the indicated turn. For this reason, it is also contemplated that the predefined distance before the intersection at which local indicator 214 is displayed can be varied as the speed of an object such as vehicle 202 varies within the virtual environment. It will be apparent that if vehicle 202 is traveling at a relatively faster rate, it will be necessary that the player be provided more advance warning of an upcoming turn, i.e., that the local indicator be displayed at a greater distance "X" before the next intersection at which the turn is to be made than would be required if the vehicle or other object were traveling at a slower speed.

Vehicle 202 is shown in dotted lines on street 226 after making the turn as indicated by local indicator 214. When in this location on street 226, global indicator 210 (now shown in dashed lines) appears in front of the vehicle on street 226, indicating the straight line-of-sight or "as the crow flies"

direction from the location of the vehicle at that point, to checkpoint 236. Since immediately after making the right turn onto street 226, vehicles 202 is not yet within the distance "X" from the next intersection where a turn will be required, a local indicator would not yet be displayed. However, as vehicle 202 approaches (within distance "X") from an intersection 230 of street 226 and street 228, local indicator 214 would be displayed, indicating that a turn is suggested to the left onto street 228 from street 226. Vehicle 202 is shown in dotted lines right after making such a turn onto street 228 and again, as approaching an intersection 234 of street 228 with a street 232. As the vehicle approaches intersection 234, local indicator 214 will again be displayed to indicate that the player should turn the vehicle left onto street 232, and global indicator 210 will be displayed, pointing toward checkpoint 236.

After making the left turn onto street 232 the player controlling vehicle 202 will stop at checkpoint 236 or otherwise tag the goal to indicate that it has been reached. Since checkpoint 236 is identified as "CHECKPOINT 3," the next successive checkpoint in a list of checkpoints yet to be reached will be a checkpoint 240, which is identified as "CHECKPOINT 4." After reaching checkpoint 236, vehicle 202 must do a U-turn in a turnabout 238. To provide a navigational hint to the player controlling vehicle 202, a local indicator 214' is displayed that indicates vehicle 202 should do a U-turn. In addition, global indicator 210 is displayed pointing toward checkpoint 240. In this preferred embodiment of the present invention, local indicator 214 can only indicate a left turn, a right turn, or a U-turn. No attempt is made to indicate whether an object should veer left or veer right through less than a 90 degree turn. However, it will be apparent that the local indicator 214 could be provided for other turns of varying degree.

When traveling along street 222 to reach the position shown in FIG. 5, vehicle 202 might have been turned right onto a street 242, if the player controlling the vehicle chose to do so. It must be emphasized that global indicator 210 and local indicator 214 are only provided as hints or suggestions for assisting the player in navigating the open grid of a virtual environment or game in which the present invention is used. If the player had chosen to turn right on street 242, the player might also have stopped at checkpoint 240 (CHECKPOINT 4) before reaching checkpoint 236 (CHECKPOINT 3) even though checkpoint 240 is out of sequence. It will be understood that some games might require a player to reach the goals in a predefined order or sequence. However, in this particular application of the present invention, a player is permitted to achieve a goal by stopping at a checkpoint out of sequence, and once the checkpoint is thus reached, the player is not again required TO DRIVE the vehicle to reach the checkpoint, because the checkpoint is removed from the list of unattained checkpoints. Accordingly, once a player has reached a checkpoint or goal in the game, that fact is noted, and global indicator 210 and local indicator 214 will be displayed to direct the player to control the vehicle to each remaining unattained checkpoint in the sequence of checkpoints.

A further point should also be noted in regard to the use of a local indicator to provide a navigational aid to the player controlling vehicle 202. As stated above, the player might have turned vehicle 202 right onto street 242 from street 222 and proceeded up street 228 after making a left turn from street 242. Thus, the player could have followed an alternative path to reach checkpoint 236 other than that indicated by local indicator 214 at intersection 224. However, the present invention does not display the local indicator to suggest that the object be turned at the next intersection, so long as continuing straight ahead will continue to enable a player to reach the next checkpoint or goal. For this reason, local indicator 214 is not displayed to indicate a right turn onto street 242 from street 222, but instead is only displayed once vehicle 202 is approaching intersection 224, where the vehicle must make a right turn in order to continue on toward checkpoint 236.

Logic Applied in Implementing the Present Invention

Figures 6, 7, 8:
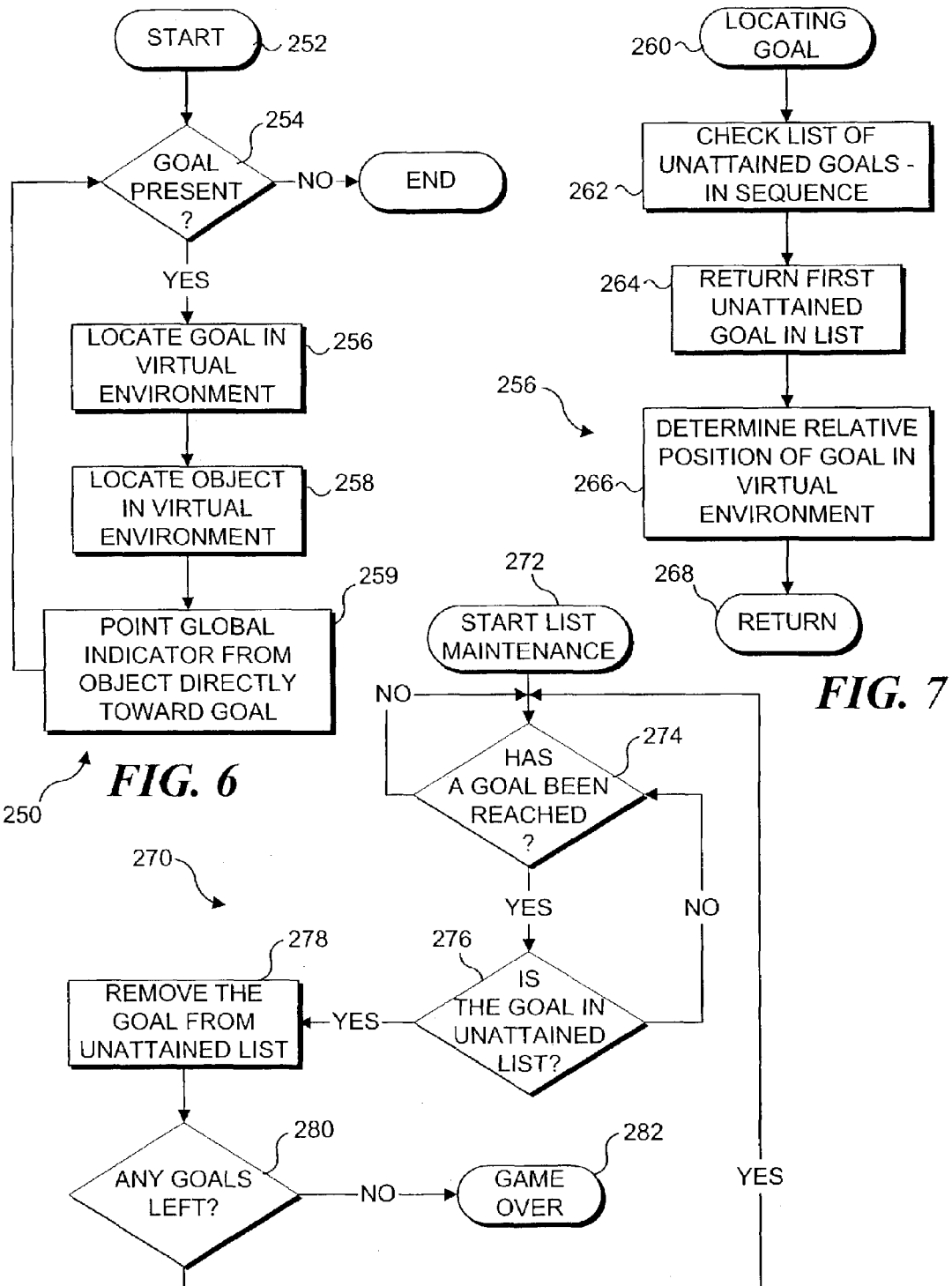
FIG. 6 is flow chart that shows the logical steps implemented in displaying the global arrow or other global indicator that points along a straight line toward the next goal in a list of goals.
FIG. 7 is a flow chart showing the logical steps for locating the next goal in the virtual environment.
FIG. 8 is a flow chart showing the steps employed in maintaining the list of goals.

A flowchart 250 in FIG. 6 illustrates the steps implemented in displaying the global indicator in the present invention. From a start block 252 a decision step 254 determines if any goal is present within the virtual environment. Again, the virtual environment includes an open grid through which an object is being navigated by a user. If no goal is yet unattained, it is presumed that the user has reached all of the goals and the logic terminates. However, if any goal remains to be reached, the logic proceeds with a step 256 that locates the next unattained goal in the virtual environment. Depending on the nature of the virtual environment and its implementation, a coordinate system may be provided that defines the location of each goal within the virtual environment using game coordinates. However, other techniques can also be used for specifying the location of each goal in the virtual environment. Next, in a step 258, the software locates the object that is being navigated through the open grid in the virtual environment, using the coordinate system or other appropriate technique, as noted above. Next, a step 259 displays the global indicator so that it points from the object directly toward the goal.

In FIG. 7, details of locating the next unattained goal in the virtual environment in step 256 are illustrated. From a start block 260, a step 262 preferably provides for checking a list of unattained goals that are maintained in sequence. In this application of the present invention, the goals may be reached in any particular order, but unattained goals are nevertheless identified in an ordered list or some other form of data. As noted above, once a goal has been reached in the exemplary game, the goal is removed from the list of unattained goals. Accordingly, a step 264 returns a first unattained goal from the list of unattained goals. Next, a step 266 determines the relative location of the goal in the virtual environment, using the game coordinate system or some other appropriate technique. Control is then returned to step 258 in FIG. 6, as indicated by a block 268.

A flow chart 270 in FIG. 8 illustrates steps for maintaining the list of unattained goals. From a start block 272, a decision block 274 determines if the player has controlled the object so that a goal has just been reached. If not, the logic continues looping until the player reaches a goal. Once a goal has been reached, a decision step 276 determines if the goal that has just been reached is in the unattained list of goals. If not, it is assumed that the player has previously reached this goal and that this goal need not be considered again, since it has already been removed from the list of goals. Accordingly, the logic returns to decision step 274 to await the player reaching another goal. However, if decision step 276 determines that the goal is in the list of unattained goals, a step 278 removes the goal from the unattained list. Next, a decision step 280 determines if any goals remain to be reached in the unattained list, and if not, a step 282 indicates that the game is over. If there are still unattained goals to be reached by the player, the logic returns to decision step 274 to await the player reaching another goal.

Figure 9:
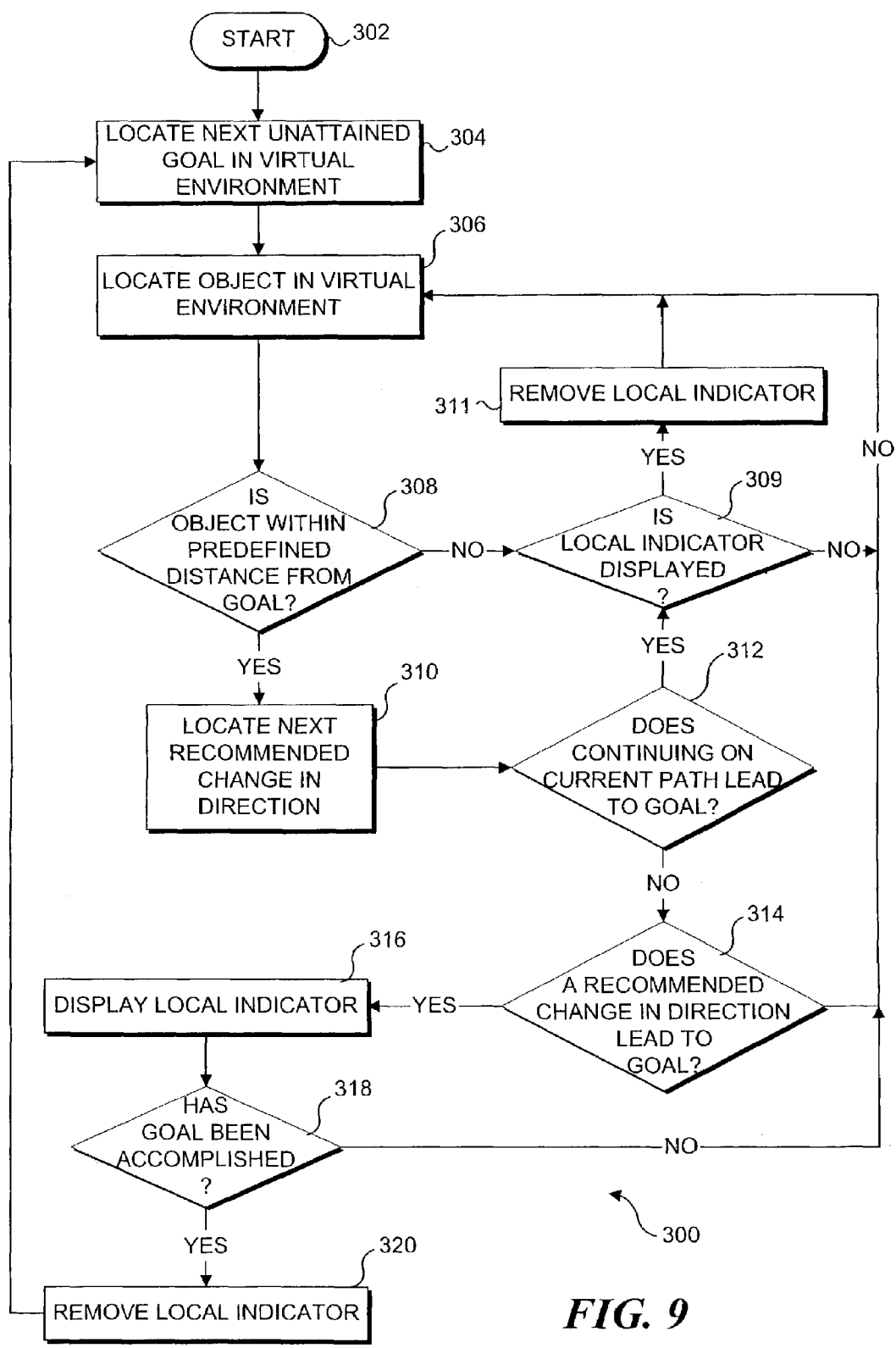
FIG. 9 is a flow chart illustrating the logical steps implemented to display the local arrow or other indicator suggesting the next turn in the open grid that should be taken to reach the next goal.

A flow chart 300, which is shown in FIG. 9, illustrates the logical steps that are implemented in order to facilitate displaying the local indicator. From a start block 302, a step 304 provides for locating the next unattained goal in the virtual environment. This step corresponds to the logical steps shown in FIG. 7. Next, a step 306 provides for locating the object in a virtual environment. In both steps 306 and 304, the game coordinate system or other appropriate technique can be used for specifying the location of both the next unattained goal and the object that is being navigated through the open grid.

A decision step 308 next determines if the object is within a predefined distance from the goal. As noted above, it is contemplated that the predefined distance can be varied as a function of the speed of the object within the virtual environment. If this option is employed, an object traveling at a higher speed will result in the predefined distance being increased compared to the case when an object is traveling at a slower speed. If the object is not within the predefined distance from the goal, the logic continues with a decision step 309, which determines if the local indicator is currently being displayed. If so, since the object is not within the predefined distance from the goal, a step 311 provides for removing the local indicator from the display. The logic then continues back to step 306. Similarly, if the local indicator is not currently being displayed in decision step 309, the logic also simply returns to step 306.

If the result in decision step 308 is affirmative, a step 310 locates the next recommended change in direction of the object in regard to the open grid of the virtual environment. In regard to the simple example shown in FIG. 5, step 310 would locate the next street that turns left or right relative to the current street on which the object is traveling. In addition, a recommended turn can also include a U-turn where a turnabout is disposed ahead on the current street being traveled by the object. After step 310, a decision step 312 determines if continuing on the current path will lead the object to the next unattained goal. If so, the local indicator should not be displayed for the next recommend change in direction, and the logic advances to decision step 309 to determine if the local indicator is currently being displayed, and if so, step 311 removes the local indicator from the display. Conversely, if the local indicator is not currently being displayed, the logic loops back to step 306. If continuing on the current path does not lead to the goal, a decision step 314 determines if the next suggested change in direction leads to the goal. If not, the logic returns to step 306; however, if the response to decision step 314 is affirmative, a step 316 displays the local indicator. Next, a decision step 318 determines if the goal has been reached or otherwise accomplished. If the goal has not been accomplished, the logic again returns to step 306. Once the goal has been accomplished, a step 320 removes the local indicator, and the logic loops back to step 304.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for providing assistance to a user in navigating an object to a user in navigating an object to one or more unattained goals during a game in an open grid type virtual environment, comprising the steps of:

maintaining a listing of one or more unattained goals within a virtual environment for which an object is to be navigated to by a user during a game;

removing any unattained goal reached by the object during game play and that is included within the listing of the one or more unattained goals once it has been determined that the object has reached the unattained goal and such that the listing of the one or more unattained goals only includes unattained goals that still remain to be reached by the object during the game;

identifying a next listed unattained goal within the listing that still remains to be reached by the object during the game;

repeatedly displaying a global indicator that points in a direction directly from the object toward the next listed unattained goal within the virtual environment upon determining that the next listed unattained goal is present and until the next listed unattained goal is reached by the object and removed from the listing, and by at least iteratively performing the following:

identifying a current location of the next listed unattained goal within the virtual environment;

identifying a current location of the object within the virtual environment; and displaying the global indicator to point in a direction directly from the object toward the next listed unattained goal within the virtual environment, and such that the global indicator is repeatedly displayed from a time in which the next listed unattained goal is determined to be present and until the next listed unattained goal is reached by the object and removed from the listing, and such that each repeated display of the global indicator points in a direction directly from the object toward the next listed unattained goal and so as to dynamically reflect change in the current location of the object as the object is navigated within the virtual environment;

providing a local indicator, which is graphically distinguished from the global indicator, and that generally points to indicate a direction of a specific turn to be taken by the object in the virtual environment-for reaching the goal; and displaying the local indicator in the virtual environment at least before the specific turn can be taken by the object to reach the goal, and wherein the local indicator is displayed simultaneously with the global indicator, at least temporarily.

2. The method of claim 1, wherein the step of displaying the local indicator includes the step of enabling the display of the local indicator only when the object is within a predefined distance from the specific turn.

3. The method of claim 2, further comprising the step of varying the predefined distance as a function of a speed of the object within the virtual environment.

4. The method of claim 3, wherein the predefined distance is greater for a higher speed of the object than for a lower speed of the object.

5. The method of claim 1, wherein the goal is one of a plurality of goals that are to be reached by the object within the virtual environment, further comprising the steps of pointing the global indicator in the direction of a successive unattained goal included within the listing of one or more unattained goals that is yet to be reached by the object after the next unattained goal is reached and removed from the listing.

6. The method of claim 5, further comprising the step of displaying the local indicator so as to indicate successive turns that should be taken in the virtual environment to reach the successive unattained goal.

7. The method of claim 5, wherein the global indicator and the local indicator only respond to the location of a current goal in the virtual environment and wherein the next unattained goal is the current goal until being reached and after which the successive unattained goal becomes the current goal.

8. The method of claim 5, further comprising the step of deleting a particular unattained goal from the listing of the one or more unattained goals after the particular unattained goal is reached by the object and prior to deleting the next unattained goal from the listing.

9. The method of claim 1, wherein the method includes refraining from displaying the local indicator before a next turn that could be taken to reach the next unattained goal when it is determined that continuing on a current path without turning the object at the next turn will still enable the object to reach the next unattained goal in the virtual environment.

10. The method of claim 1, wherein the local indicator indicates one of a left turn, a right turn, and a U-turn.

11. A memory medium storing machine instructions for carrying out the steps of claim 1.

12. The method recited in claim 1, wherein the global indicator indicates a straight-line direction between the next unattained goal and the object.

13. The method of claim 1, further comprising the step of only displaying the local indicator at times in which it is determined that a current direction in which the object is traveling will not enable the object to reach the next unattained goal.

14. The method of claim 1, wherein the local indicator indicates an orthogonal turn relative to a present direction of travel.

15. The method of claim 1, wherein the local indicator indicates a U-turn.

16. A system for providing assistance in controlling an object to reach a goal in an open grid of a virtual environment, comprising:
(a) a display on which the virtual environment is visually apparent;
(b) a memory in which machine instructions are stored;
(c) a user control for providing input to control the object in the virtual environment;
(d) a processor coupled to the display, the user control, and the memory, said processor executing the machine instructions which cause the processor to implement the method recited in claim 1.

17. The system of claim 16, wherein the machine instructions further cause the processor to display the local indicator on the display only when the object is within a predefined distance from the specific turn.

18. The system claim 17, wherein the machine instructions further cause the processor to vary the predefined distance as a function of a speed of the object within the virtual environment.

19. The system of claim 16, wherein the next unattained goal is one of a plurality of unattained goals that are to be reached by the object within the virtual environment, and wherein the machine instructions further cause the processor to display the global indicator pointing in a direction of each of the unattained goals in the listing that is yet to be reached by the object in a successive order and until each of the unattained goals is reached.

20. The system of claim 19, wherein the machine instructions further cause the processor to display the local indicator on the display so as to indicate successive turns that should be taken in the virtual environment to reach a subsequent unattained goal that is yet to be reached by the object, and only after the next unattained goal is reached.

21. The system of claim 19, wherein the machine instructions further cause the processor to control the global indicator and the local indicator to only respond to the location of a current goal in the virtual environment and wherein the next unattained goal is the current goal until being reached and after which a successive unattained goal in the listing becomes the current goal.

22. The system of claim 19, wherein the machine instructions further cause the processor to delete a specific unattained goal from the listing of unattained goals after the specific unattained goal is reached by the object, and even if the specific unattained goal was not reached in a predefined order.

23. The system of claim 16, wherein the machine instructions further cause the local indicator not to be displayed before a next turn that could be taken to reach the next unattained goal, if continuing to move the object on a current path without turning will still enable the object to reach the next unattained goal in the virtual environment.

24. The system of claim 16, wherein the machine instructions further cause the processor to employ the local indicator to indicate a U-turn.

25. The method recited in claim 1, wherein the local indicator and the global indicator each point in a different direction while being displayed simultaneously.

26. The method recited in claim 1, wherein the global indicator includes an arrow head graphic and the local indicator includes a different arrow head graphic.

27. The method of claim 26, wherein the arrow head graphic of the global indicator is larger than the different arrow head graphic of the local indicator.

28. The method recited in claim 1, wherein the global indicator is displayed directly above the object within a display of the virtual environment.

29. The method recited in claim 1, wherein the local indicator is displayed directly above the object within a display of the virtual environment.

30. The method recited in claim 1, wherein the virtual environment includes one or more paths that lead from the object to the next unattained goal and wherein the global indicator is displayed independently of the one or more paths.

* * * * *